(12) United States Patent
Lance

(10) Patent No.: US 8,677,272 B2
(45) Date of Patent: Mar. 18, 2014

(54) GRAPHICAL USER INTERFACE DESIGN UTILITY

(75) Inventor: John M. Lance, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 1534 days.

(21) Appl. No.: 11/164,977

(22) Filed: Dec. 13, 2005

(65) Prior Publication Data

US 2007/0136691 A1 Jun. 14, 2007

(51) Int. Cl.
*G06F 3/048* (2013.01)

(52) U.S. Cl.
USPC .............................. 715/810; 715/764; 715/827

(58) Field of Classification Search
USPC .................. 715/810, 827, 847, 853–855, 841
See application file for complete search history.

(56) References Cited

U.S. PATENT DOCUMENTS

| | | | |
|---|---|---|---|
| 4,860,291 A | 8/1989 | Damm et al. | |
| 4,933,514 A | 6/1990 | Bowers | |
| 5,668,965 A | 9/1997 | Matsumoto et al. | |
| 5,724,559 A | 3/1998 | Masemore | |
| 6,002,867 A | 12/1999 | Jazdzewski | |
| 6,084,585 A | 7/2000 | Kraft et al. | |
| 6,219,680 B1 | 4/2001 | Bernardo et al. | |
| 6,239,802 B1 | 5/2001 | Lahey et al. | |
| 6,259,446 B1 | 7/2001 | Matheny et al. | |
| 6,538,697 B1 | 3/2003 | Honda et al. | |
| 6,745,203 B1 | 6/2004 | Garg et al. | |
| 2004/0075696 A1* | 4/2004 | Koch et al. | 345/827 |
| 2004/0080547 A1* | 4/2004 | Goto | 345/827 |
| 2005/0108657 A1* | 5/2005 | Han | 715/827 |
| 2005/0160373 A1* | 7/2005 | Chakravarty et al. | 715/827 |
| 2006/0059011 A1* | 3/2006 | Ulreich et al. | 705/1 |

FOREIGN PATENT DOCUMENTS

| | | |
|---|---|---|
| JP | 62050931 A | 3/1987 |
| JP | 2077838 A | 3/1990 |
| JP | 5298082 A | 11/1993 |
| JP | 6230953 A | 8/1994 |
| JP | 7175620 A | 7/1995 |
| JP | 7319680 A | 12/1995 |
| JP | 8-063481 A | 3/1996 |
| JP | 2003005967 A | 1/2003 |
| JP | 2006139569 A | 6/2006 |

OTHER PUBLICATIONS

Generic Cascade Menu to Create New Object Instances, IBM Technical Disclosure Bulletin, Sep. 1994, pp. 347-350.
Power Tools, IBM Technical Disclosure Bulletin, Sep. 1989, pp. 262-265.
Menus as Containers of Choices for an End-User, IBM Technical Disclosure Bulletin, Mar. 1994, pp. 455-456.

* cited by examiner

*Primary Examiner* — Ramsey Refai
*Assistant Examiner* — Meseker Takele
(74) *Attorney, Agent, or Firm* — Cuenot, Forsythe & Kim, LLC

(57) ABSTRACT

A method of validating a menu design for a computer program can include identifying a plurality of menu nodes, wherein each node is associated with at least one attribute, comparing attributes of different menu nodes according to a use case, and indicating whether a conflict exists between attributes of different menu nodes for the use case.

20 Claims, 4 Drawing Sheets

| File Menu | | Mail | Calendar | Calendar | Calendar |
| --- | --- | --- | --- | --- | --- |
| Menu Level 1 | Menu Level 2 | Nothing selected in mail view | Calendar w/ nothing selected | Calendar with entry selected | Side calendar with entry selected |
| Filters | | | | | |
| New> | | Enabled | Enabled | Enabled | Enabled |
| | Message | Enabled | Enabled | Enabled | Enabled |
| | Address Book Contact | Disabled | Disabled | Disabled | Disabled |
| | Address Book Group | Disabled | Disabled | Disabled | Disabled |
| | Reminder | Enabled | Enabled | Enabled | Enabled |
| | Meeting | Enabled | Enabled | Enabled | Enabled |
| | Appointment | Enabled | Enabled | Enabled | Enabled |
| | Folder | Enabled | Enabled | Enabled | Enabled |
| | Chat... | Enabled | Enabled | Enabled | Enabled |
| | Contact... | Enabled | Enabled | Enabled | Enabled |
| | Group... | Enabled | Disabled | Enabled | Enabled |
| Open Ctrl+O | | Disabled | Enabled | Enabled | Enabled |
| Open in New Tab> | | Enabled | Enabled | Enabled | Enabled |
| | 1-day Calendar | Enabled | Enabled | Enabled | Enabled |
| | 5-day Calendar | Enabled | Enabled | Enabled | Enabled |

FIG. 3

GRAPHICAL USER INTERFACE DESIGN UTILITY

FIELD OF THE INVENTION

The present invention relates to software development and, more particularly, to designing menus for use with computer programs and/or graphical user interfaces.

DESCRIPTION OF THE RELATED ART

Aside from using a pointing device, the predominant means by which users interact with computer programs is through the use of a menu. To facilitate ease of use, menus are designed in a logical fashion and in a way that allows a user to easily find the various functions available within the program. Typically, a menu includes a top level set of menu items, or nodes, with child menu nodes organized beneath each respective top level menu node. In this manner, additional levels of detail are provided and embedded within the menu structures. Still, programs are becoming increasingly complex, offering an ever-growing array of functions. As expected, the menus needed to access these functions have grown to match program complexity. Often, menus tend to sprawl out across a display screen with several hierarchical levels.

Presently, menu design is an independent endeavor with respect to the creation of a computer program in that a designer first designs the menu. The designer writes a text document, or menu specification, that specifies the menu structure to be used for the program. In addition to the actual menu structure, the menu specification specifies the state of the menu for corresponding operational states of the program. The operational state of the program, also referred to as a use case in some instances, indicates the context of the program at a given point in time. The use case, for example, can indicate the values stored in different variables of the computer program. A use case also can reflect the various user inputs that have been provided to the program and which placed the program in that particular operational state. In any case, the menu specification used to describe the program menu, like the program itself, tends to be large and complex. In consequence, the menu specification usually is difficult to manage and difficult to understand.

It is this menu specification, however, that programmers use as a blueprint from which the program menu actually is coded. Additionally, once coded, quality engineers then utilize the menu specification to validate the menu implementation within the program since it is the menu specification that specifies the state of the menu for different operational states, as reflected by different use cases, of the program. As noted, the convoluted nature of the menu specification document makes it difficult for both programmers and quality engineers to glean the information necessary to code and/or validate the menu implementation.

Accordingly, it would be beneficial to provide a technique and/or tool capable of presenting menu state information in a manner that overcomes the limitations described above.

SUMMARY OF THE INVENTION

The present invention provides methods and articles of manufacture relating to menu design and validation for computer programs. One embodiment of the present invention can include a computer-implemented method of validating a specified menu design for a computer program. The method can include storing a plurality of menu nodes for a menu design for the computer program, wherein each menu node is associated with at least one attribute and wherein the plurality of menu nodes is arranged with a defined hierarchical organization, selecting a use case for the computer program, wherein the use case specifies an operational state of the computer program at a selected time during runtime and which of the plurality of menu nodes are enabled, and determining which of the plurality of menu nodes are enabled according to the use case. The method also can include comparing attributes of different ones of the menu nodes that are enabled, determining whether a conflict exists, and displaying whether a conflict exists.

Another embodiment of the present invention can include a computer-implemented method of validating an existing menu design for a program including determining a subset of a hierarchy of menu nodes according to a selected use case, wherein the selected use case specifies an operational state of the computer program at a selected time during runtime and which of the plurality of menu nodes are enabled. The method further can include displaying a visual representation of the subset of the hierarchy of menu nodes and displaying the selected use case by visually indicating whether each menu node in the subset is enabled and concurrently visually indicating whether any menu nodes that are enabled have conflicting attributes.

Another embodiment of the present invention can include a computer readable storage, having stored thereon, a computer program having a plurality of code sections executable by a computer for causing the computer to perform the various steps and methods disclosed herein.

BRIEF DESCRIPTION OF THE DRAWINGS

There are shown in the drawings, embodiments which are presently preferred; it being understood, however, that the invention is not limited to the precise arrangements and instrumentalities shown.

FIG. 3 is a pictorial view of a GUI for use with a menu design tool in accordance with another embodiment of the present invention.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments described herein relate to the design and/or validation of a computer program menu. In accordance with the embodiments described herein, menu items can be specified along with various attributes for the menu items. Through the attributes, the behavior of the menu items, as well as a hierarchy of menu items can be specified. Further, the present invention can create a visual representation of the state of the menu, and various portions thereof, for different use cases relating to the program.

Figure 1:
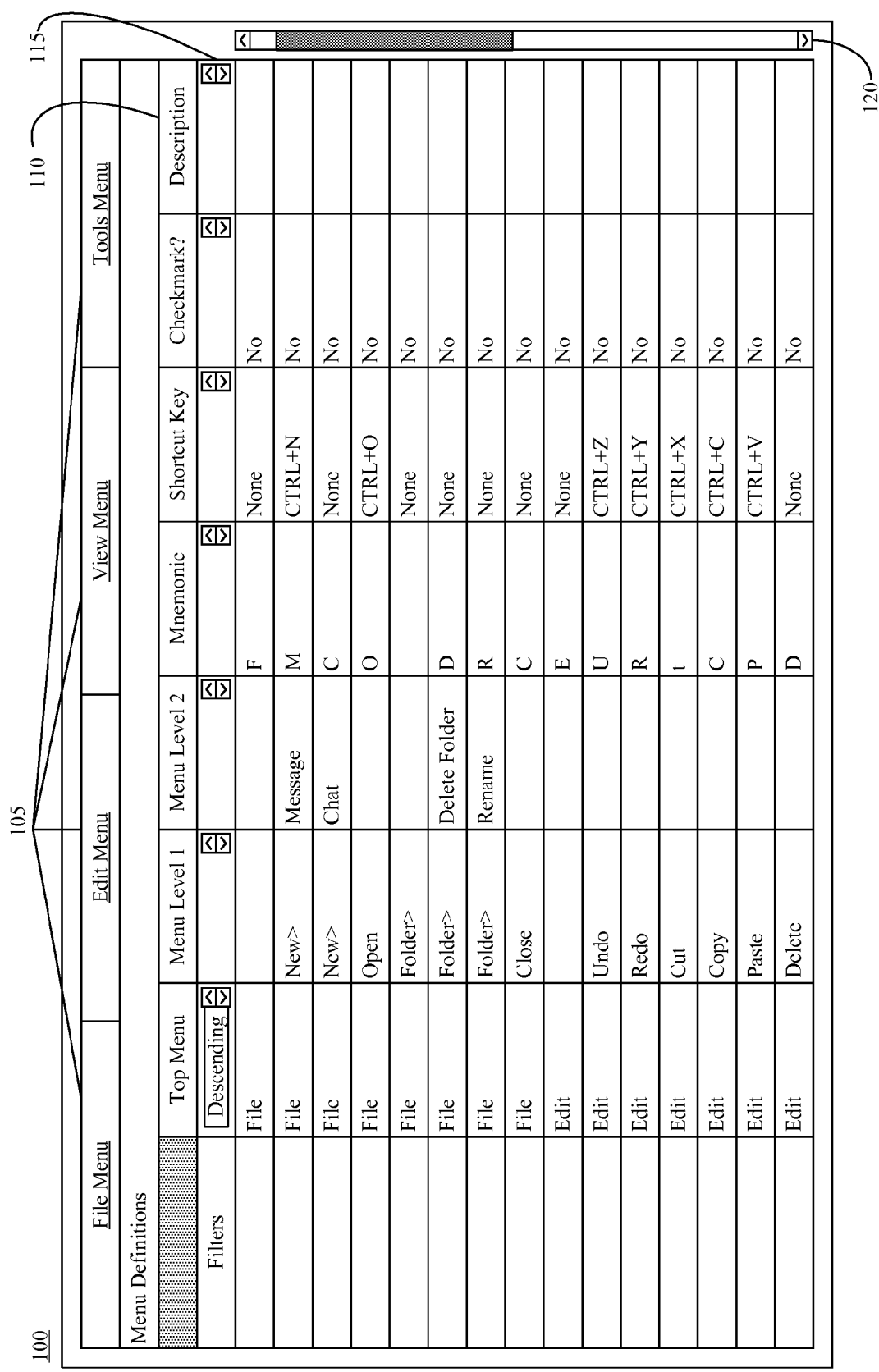
FIG. 1 is a pictorial view of a graphical user interface (GUI) for use with a menu design tool in accordance with one embodiment of the present invention.

FIG. 1 is a pictorial view of a graphical user interface (GUI) 100 for use with a menu design tool in accordance with one embodiment of the present invention. GUI 100 can be used to specify the menu nodes of a menu as well as various attributes of those menu nodes and serve as an interface to the menu design tool. Across the top of GUI 100 are a series of selectable icons 105. In one embodiment, the selectable icons 105 can be hyperlinked text, though any variety of selectable user interface element can be used. The selectable icons 105 can include "File Menu", "Edit Menu", "View Menu", and "Tools Menu" icons. Each of the selectable icons can correspond to a top level menu item available in the program for which the menu is being created. These buttons can be generated dynamically as will be described in further detail herein. A top level menu node refers to the menu titles or objects that typically are available across a task bar of a computer program and when selected, cause a drop down menu to extend therefrom. Selecting any of the selectable icons 105 causes a further GUI to be displayed which is dedicated to the selected top level menu node, i.e. the File Menu structure, the View Menu structure, etc.

The row of column headers 110 illustrates the various items of information and/or attributes that can be specified using GUI 100. As shown, column headers 110 include "Top Menu", "Menu Level 1", "Menu Level 2", "Mnemonic", "Shortcut Key", "Checkmark?", and "Description". Further headers can be included if so desired such as an "Additional Conditions" column and a "Special Cases" column. A menu designer can enter information directly into the fields of the GUI 100 to specify the various menu nodes and corresponding attributes. For example, once the top level menu nodes are entered by a designer, corresponding selectable icons 105 can be dynamically generated across the top of GUI 100 by the menu design tool for each such top level menu node.

The column headers "Top Menu", "Menu Level 1", and "Menu Level 2" indicate the particular location within a menu hierarchy in which a menu node is located. The placement of each menu node also indicates the placement of the menu node within the hierarchy, i.e. specifying the parent and/or child menu nodes of that menu node. As shown, top level menu nodes can include "File". Further top level menu nodes can include those listed across the top, i.e. selectable icons 105 and can be viewed by appropriately accessing scroll bar 120. The column entitled "Menu level 1" indicates the subset of menu nodes that are listed within a drop down menu extending below a selected top level node. The column entitled "Menu level 2" indicates those menu nodes that can be listed within a "pop-out" type menu by selecting one of the level 1 menu items. In illustration, the menu structure illustrated in FIG. 1 indicates that the menu structure includes a top level menu node "File". When "File" is selected, a level 1 menu node "New" is available. Selection of the level 1 menu node "New" allows a user to select between creating a new message or a new chat session through selection of level 2 menu nodes "Message" or "Chat" respectively.

The next column called "Mnemonic" lists the mnemonic that is associated with each menu node, if one has been assigned. A mnemonic is an abbreviation that is chosen to be easy for humans to remember for a given menu node. In the context of a computer program menu, a mnemonic commonly is a single key or character that is assigned to a menu node and can be entered when a drop down menu has been activated. The next column, called "Shortcut Key" indicates the shortcut key combinations that can be used to activate the various functions otherwise activated through the menu nodes. While a mnemonic is used when a menu has been activated or selected, a shortcut key typically invokes a function without requiring the user to access the menu structure at all.

The next column, called "Checkmark?" indicates whether after selecting the menu node, it will be visually indicated that the menu node is or has been selected, for example through the use of a checkmark or other visual indicator placed proximate to the menu node in the menu. The column entitled "Description" is available for designer commentary or other supplemental information. Row 115 includes a collection of filters which allow the designer to reorder the menu nodes within the column in ascending or descending order, as well as filter for a particular attribute value, etc.

Figure 2:
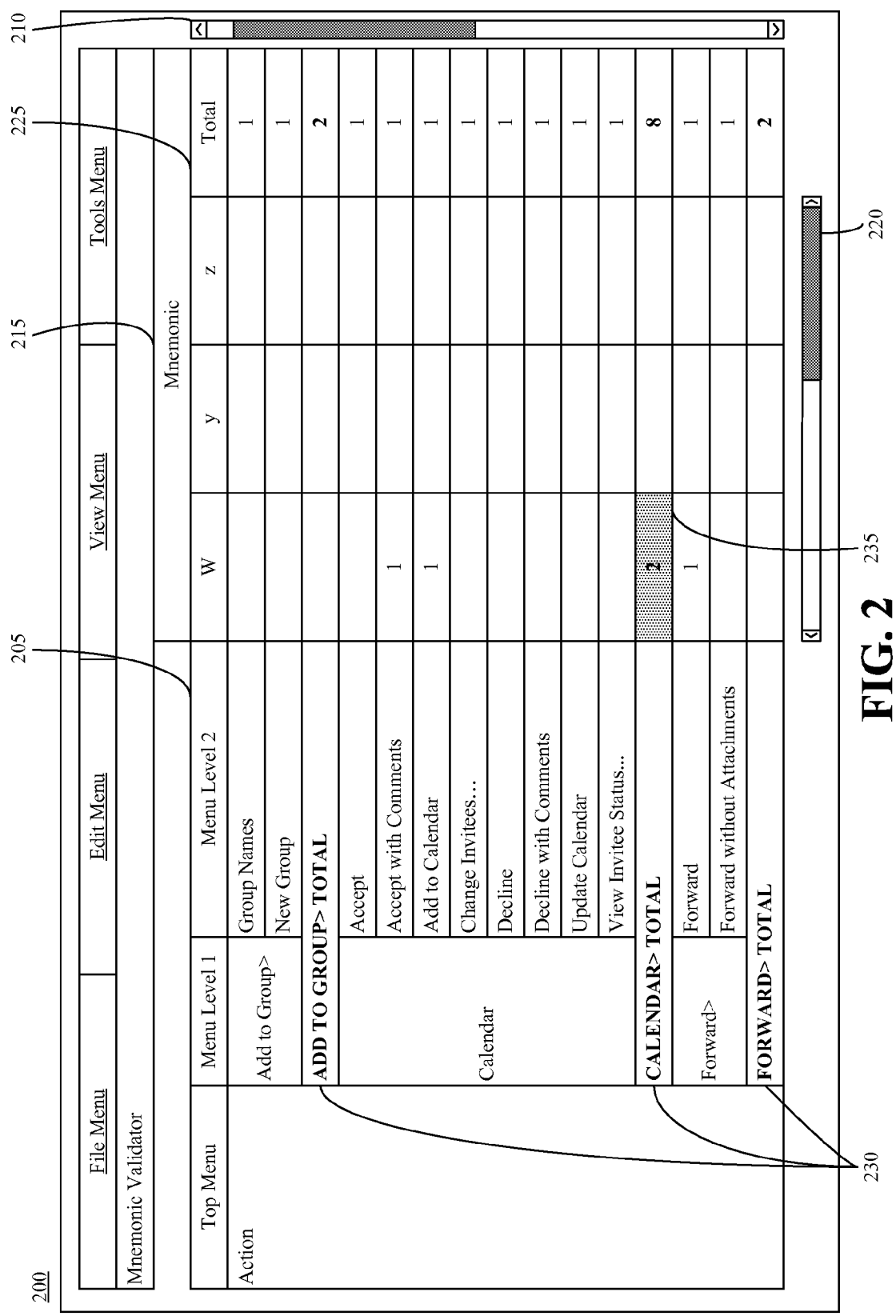
FIG. 2 is a pictorial view of a GUI for use with a menu design tool in accordance with another embodiment of the present invention.

FIG. 2 is a pictorial view of a GUI 200 for use with a menu design tool in accordance with another embodiment of the present invention. GUI 200 illustrates a mnemonic validation function of the menu design tool. In accordance with the embodiments disclosed herein, the mnemonics assigned to different menu nodes can be analyzed to determine whether a conflict exists, or potentially exists. GUI 200, like GUI 100, can include a column header row 205 with column headers such as "Top Menu", "Menu Level 1", and "Menu Level 2". Further columns for additional menu levels can be included if needed based upon the particular menu hierarchy being designed, i.e. "Menu Level 3", Menu Level 4", etc. Thus, as shown in FIG. 2, top level menu node "Action" has menu level 1 menu node children of "Add to Group", "Calendar", "Forward", and possible others not shown, but accessible via vertical scroll bar 210.

The column heading "Mnemonic" 215 indicates the particular mnemonics that have been assigned to the various menu nodes. A "1" in a field indicates that the mnemonic at the top of the column has been assigned to the corresponding menu node. Thus, for example, the level 2 menu nodes "Accept with Comments" and "Add to Calendar" both have been assigned the mnemonic "W". The columns with mnemonic headings "W", "y", and "z" represent only some of the mnemonics that have been assigned. Further mnemonics can be viewed by scrolling left or right using horizontal scroll bar 220. The column entitled "Total" 225 as well as columns "Top Menu", "Menu Level 1", and "Menu Level 2", however, can be stationary. The "Total" column 225 sums the indicators in each row and further for all of the level 2 menu node children for a given level 1 menu node.

In illustration, the total column 225 can be reviewed and indicates that for all of the level 2 menu nodes shown, each has been assigned a mnemonic, as indicated by the presence of a "1" in each total box. Each level 1 menu node can have a "Total" row 230, i.e. "ADD TO GROUP>TOTAL", "CALENDAR>TOTAL", and "FORWARD>TOTAL". A review of the "Total" column 225 in the row entitled "ADD TO GROUP>TOTAL" indicates that 2 mnemonics have been assigned to the "Add to Group" level 1 menu item, which has two level 2 menu node children. If the total was less than the number of level 2 menu nodes beneath "Add to Group", one or more level 2 menu nodes would be missing a mnemonic. If the total is higher than the number of level 2 menu nodes beneath "Add to Group", one or more level 2 menu nodes are assigned more than one mnemonic.

Within the "TOTAL" rows 230, i.e. "ADD TO GROUP>TOTAL", "CALENDAR>TOTAL", and "FORWARD>TOTAL", possible mnemonic conflicts can be indicated. More particularly, the shaded box 235 with the number 2 in the row entitled "CALENDAR>TOTAL", indicates that two of the level 2 menu nodes beneath level 1 menu node "Calendar" have been assigned the same mnemonic, in this case "W". The shaded box 235, as well as the number within, indicates a potential conflict. That is, if both menu items are to be concurrently available for a given use case, each needs a unique mnemonic, at least with respect to the other level 2 menu nodes beneath "Calendar".

It may be the case, however, that the use case for the menu nodes prevents menu nodes "Accept with Comments" and "Add to Calendar" from being available concurrently. That is, if one is available, the other may be disabled and grayed out. If such is the case, the two menu items may share a common or same mnemonic.

As used herein, a use case refers to a particular operational state of the computer program for which the menu is being designed. For each given use case, the menu has a particular state. In other words, for each operational state of the computer program, the menu has a particular state. The menu state defines the values for the attributes of the menu nodes forming the menu. For example, within a given operational state, certain menu nodes may be available and others not available. The state of each menu node, as reflected in the attributes of the menu nodes, can be associated with a given use state.

In illustration, a simple use case can be a user selection of the top level menu node "File" within an application program, where no document is loaded within the application. Responsive to a user selection of "File", the menu should be placed into a defined state. For example, it may be the case that only particular level 1 menu nodes beneath "File" should be enabled. In the case of a word processor, for instance, the available level 1 menu nodes may be limited to "New" to create a new document or "open" to open an existing document. Other menu nodes relating to a document that is opened within the word processing application would not be available until a document is created or opened.

It should be appreciated that the various data fields represented in FIG. 2 can be populated automatically based upon data entered by the menu designer, i.e. in GUI 100. Accordingly, the various functions disclosed herein with respect to identifying missing mnemonics, missing shortcuts, conflicting mnemonics and/or shortcuts, for example, can be performed in an automated fashion.

FIG. 3 is a pictorial view of a GUI 300 for use with a menu design tool in accordance with another embodiment of the present invention. As shown, GUI 300 corresponds to the "File Menu" top level menu item. Each top level menu node can have a dedicated GUI view, such as GUI 300, which allows a designer to work with a particular top level menu node. GUI 300 is an example of the sort of GUI that can be presented upon selection of one of the selectable icons 105 discussed with reference to FIG. 1. In this case, responsive to selecting the "File Menu" icon 105 of FIG. 1, GUI 300 can be presented.

GUI 300 allows a designer to specify the state of menu nodes for a set of use cases as those use cases relate to a specific top level menu item, in this case "File". As shown, the following use cases 305 are specified "Nothing selected in mail view", "Calendar w/nothing selected", "Calendar with entry selected", and "Side calendar with entry selected". The use cases 305 shown correspond to a personal information manager with electronic mail and calendar functions. As noted, each use case 305 describes a particular operational state of the computer program for which the menu is being designed.

In accordance with another embodiment of the present invention, each use case 305 can be a selectable icon or other visual element. Once selected, a view of the operational state of the computer program can be displayed. That is, the menu designer can store a screen shot illustrating the operational state of the computer program that corresponds to the use case. Responsive to selecting one of the use cases 305, the associated screenshot case can be displayed. GUI 300 also allows a menu designer to specify particular states for each menu node on a per use case basis. For example, in one embodiment, the designer can indicate whether a given menu node is enabled or disabled for each use case. Filters 310 also are provided as discussed with reference to FIG. 1.

It should be appreciated that the GUIS disclosed herein have been provided for purposes of illustration only and, as such, are not intended to limit the present invention in any way. For example, one or more visual elements and/or controls of the GUIS can be changed or altered without departing from the spirit of the embodiments disclosed herein. Any suitable GUI capable of receiving and/or providing information as described herein can be used.

Figure 4:
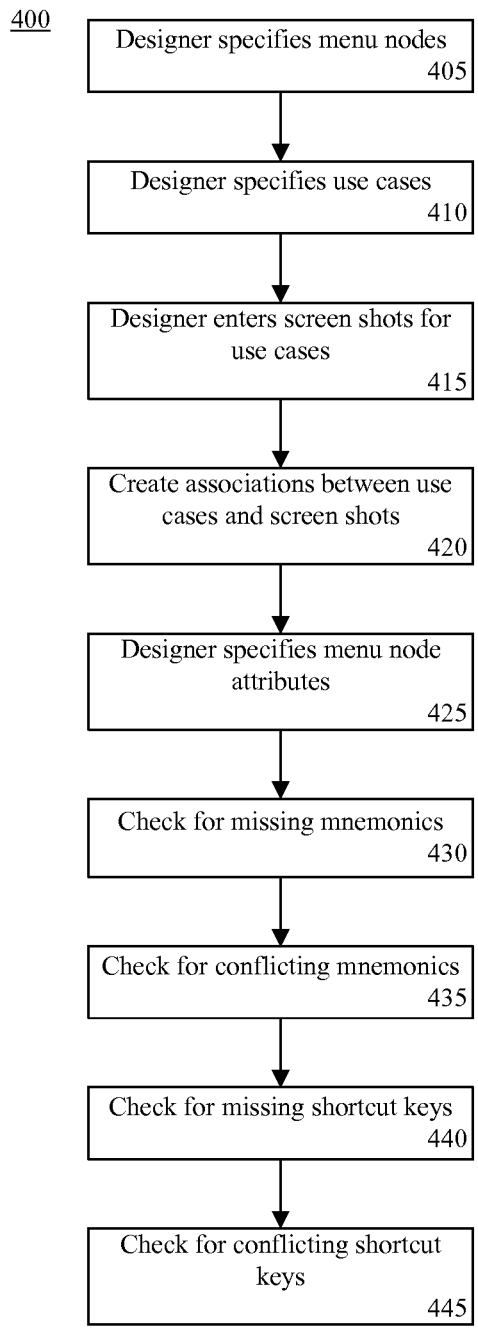
FIG. 4 is a flow chart illustrating a method of designing a menu in accordance with yet another embodiment of the present invention.

FIG. 4 is a flow chart illustrating a method 400 of designing a menu in accordance with yet another embodiment of the present invention. Method 400 can be performed using a menu design tool as described herein with reference to FIGS. 1-3. Accordingly, method 400 can begin in step 405, where a designer, using the design tool, can specify menu nodes. The designer can enter each of the menu nodes to be used in constructing the menu structure for the program.

In step 410, the designer can enter each of the use cases for which the menu will have to have a corresponding state. In step 415, the designer optionally can enter or load screen shots corresponding to the various use cases entered in step 410. In step 420, the design tool can create an association between each screen shot and the use case corresponding to that screen shot. Accordingly, when the use case is later selected, the designer can be brought to a view of the screen shot that is associated with the selected use case.

In step 425, the designer can specify attributes for the menu nodes. The attributes can include, but are not limited to, mnemonics, shortcut keys, descriptions, special cases, a menu level assignment, whether the menu node is checked, and whether the menu node is enabled or disabled on a per use case basis. Though not discussed with reference to FIG. 3, other possible states for a menu item can include, but are not limited to, a hidden state where the menu node is not visible and a special case which allows the designer to specify a special non-conventional behavior for the menu item.

In step 430, the design tool can evaluate the attributes for the different menu items. The design tool then can identify any menu items which are lacking a mnemonic. It should be appreciated that searching and/or filtering for missing mnemonics can be performed on a global level, for menu items within a same menu level, for menu items within a same menu level and having a same parent menu node, etc. In step 435, the design tool can evaluate and/or compare attributes to identify any menu nodes having conflicting mnemonics. In one embodiment, for example, the design tool can analyze menu items that have a common parent menu node, i.e. those that have a same menu level attribute and are accessed via a same menu node within the menu level above. Those menu nodes that have a same mnemonic can be identified and visually indicated.

In step 440, the design tool can evaluate the menu nodes and corresponding attributes to identify those menu nodes that are missing shortcut keys. Any such menu nodes can be visually indicated, for example upon request of the developer. In step 445, the design tool can evaluate and/or compare the menu nodes and corresponding attributes to check for conflicting shortcut keys. Because shortcuts are global in nature, the comparison of shortcut keys for menu nodes can be performed across all menu nodes in the menu being developed.

The various steps described with reference to FIG. 4 have been provided for purposes of illustration only. As such, method 400 is not intended to limit the present invention in any way. For example, one or more of the steps described with reference to FIG. 4 can be performed in a different order than presented. Further, additional steps can be included, such as filtering menu nodes according to a user selected attribute, performing any one or more of the functions described herein responsive to a user request, etc.

In another embodiment of the present invention, for example, the design tool can present a report. In one aspect, the report can be a textual report indicating any one or more items of information discussed herein. For example, such a report can be provided as a listing, in tabular and/or text form, or the like, to effectively replace the text document specification of the menu that heretofore had been manually created by the menu designer. In another embodiment, the report can be a graphic or visual illustration of the state of the menu, or any portion thereof, for a given use case. Such a graphic illustration can be generated from GUI 300, for example. The graphic illustration can be a visual representation of the actual state of the menu, or a portion thereof, with selected menu nodes being disabled, hidden, etc., as appropriate, based upon the selected use case. In any case, the various reports and functions described herein allow a developer to better understand the various states of the menu structure, thereby allowing faster coding and validation of the menu.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of validating a specified menu design for a computer program comprising:
storing a plurality of menu nodes for a menu design for the computer program, wherein each menu node is associated with at least one attribute and wherein the plurality of menu nodes is arranged with a defined hierarchical organization;
selecting a use case for the computer program, wherein the use case specifies an operational state of the computer program at a selected time during runtime and which of the plurality of menu nodes are enabled;
determining which of the plurality of menu nodes are enabled according to the use case;
comparing attributes of different ones of the menu nodes that are enabled;
determining whether a conflict exists among the attributes of the menu nodes that are enabled; and
displaying whether a conflict exists.

2. The method of claim 1, wherein the attributes comprise menu level attributes, said comparing step further comprising detecting at least two menu nodes having conflicting menu level attributes according to the use case.

3. The method of claim 1, wherein the attributes comprise a mnemonic attribute, said comparing step further comprising determining whether at least two menu nodes, each being active for the use case and belonging to a same menu level beneath a same top level menu node, have a same mnemonic attribute, wherein responsive to determining that the at least two menu nodes have a same mnemonic attribute, a conflict is indicated.

4. The method of claim 1, wherein the attributes comprise shortcut attributes, said comparing step further comprising determining whether at least two menu nodes that are active for the use case have a same shortcut attribute irrespective of hierarchical organization of the menu design, wherein responsive to determining that the at least two menu nodes have a same shortcut attribute, a conflict is indicated.

5. The method of claim 1, further comprising:
responsive to a user request specifying a menu node attribute, filtering menu nodes according to the specified attribute; and
displaying menu nodes that have the specified attribute.

6. The method of claim 5, further comprising filtering menu nodes according to a specified use case.

7. The method of claim 1, further comprising selecting at least one attribute of a menu node to be a hidden state that determines whether the menu node is visible for the use case.

8. The method of claim 1, further comprising:
storing a screen shot illustrating the operational state of the computer program in association with use case; and
responsive to a user selection of the use case, displaying the screen shot associated with the selected use case.

9. The method of claim 1, further comprising displaying a visual representation of a plurality of different levels of the menu design for a plurality of different use cases concurrently, wherein for each of the plurality of different use cases, the visual representation indicates which of the menu nodes of the menu design are enabled and which of the menu nodes of the menu design are disabled on a per use case basis.

10. A computer-implemented method of validating an existing menu design for a computer program comprising:
   determining a subset of a hierarchy of menu nodes according to a selected use case, wherein the selected use case specifies an operational state of the computer program at a selected time during runtime and which of the plurality of nodes are enabled; and
   displaying a visual representation of the subset of the hierarchy of menu nodes and displaying the selected use case by visually indicating whether each menu node in the subset is enabled and concurrently visually indicating whether any menu nodes that are enabled have conflicting attributes.

11. The method of claim 10, said step of presenting a visual representation further comprising indicating whether each menu node in the subset is enabled.

12. The method of claim 10, said step of presenting a visual representation further comprising indicating whether a menu node in the subset is lacking a mnemonic attribute.

13. The method of claim 10, said step of presenting a visual representation further comprising indicating whether at least two menu nodes in the subset have conflicting mnemonic attributes.

14. The method of claim 10, said step of presenting a visual representation further comprising indicating whether at least two menu nodes have conflicting shortcut attributes.

15. A computer readable storage, having stored thereon a computer program having a plurality of code sections that, when executed by a computer, cause the computer to perform a plurality of steps, the computer-readable storage comprising:
   code for storing a plurality of menu nodes for a menu design for the computer program, wherein each menu node is associated with at least one attribute and wherein the plurality of menu nodes is arranged with a defined hierarchical organization;
   code for selecting a use case for the computer program, wherein the use case specifies an operational state of the computer program at a selected time during runtime and which of the plurality of menu nodes are enabled;
   code for determining which of the plurality of menu nodes are enabled according to the use case;
   code for comparing attributes of different ones of the menu nodes that are enabled;
   code for determining whether a conflict exists among the attributes of the menu nodes that are enabled; and
   code for displaying whether a conflict exists.

16. The computer readable storage of claim 15, wherein the attributes comprise a mnemonic attribute, wherein the code for comparing further comprises code for determining whether at least two menu nodes, each being active for the use case and belonging to a same menu level beneath a same top level menu node, have a same mnemonic attribute, wherein responsive to determining that the at least two menu nodes have a same mnemonic attribute, a conflict is indicated.

17. The computer-readable storage of claim 15, wherein the attributes comprise shortcut attributes, wherein the code for comparing further comprises code for determining whether at least two menu nodes that are active for the use case have a same shortcut attribute irrespective of hierarchical organization of the menu design, wherein responsive to determining that the at least two menu nodes have a same shortcut attribute, a conflict is indicated.

18. The computer readable storage of claim 15, further comprising:
   code for, responsive to a user request specifying a menu node attribute, filtering menu nodes according to the specified attribute; and
   code for displaying menu nodes that have the specified attribute.

19. The computer readable storage of claim 15, further comprising:
   code for storing a screen shot illustrating the operational state of the computer program in association with use case; and
   code for, responsive to a user selection of the use case, displaying the screen shot associated with the selected use case.

20. The computer readable storage of claim 15, further comprising code for displaying a visual representation of a plurality of different levels of the menu design for a plurality of different use cases concurrently, wherein for each of the plurality of different use cases, the visual representation indicates which of the menu nodes of the menu design are enabled and which of the menu nodes of the menu design are disabled on a per use case basis.

* * * * *